United States Patent
Ueno

(10) Patent No.: US 9,990,387 B2
(45) Date of Patent: Jun. 5, 2018

(54) INFORMATION PROCESSING APPARATUS, INFORMATION PROCESSING METHOD AND NON-TRANSITORY COMPUTER READABLE MEDIUM

(71) Applicant: FUJI XEROX CO., LTD., Tokyo (JP)

(72) Inventor: Kunikazu Ueno, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 469 days.

(21) Appl. No.: 14/670,533

(22) Filed: Mar. 27, 2015

(65) Prior Publication Data

US 2015/0199392 A1 Jul. 16, 2015

Related U.S. Application Data

(63) Continuation of application No. PCT/JP2013/066023, filed on Jun. 11, 2013.

(30) Foreign Application Priority Data

Nov. 1, 2012 (JP) .................................. 2012-242129

(51) Int. Cl.
*G06F 17/30* (2006.01)

(52) U.S. Cl.
CPC .. *G06F 17/30327* (2013.01); *G06F 17/30106* (2013.01); *G06F 17/30601* (2013.01)

(58) Field of Classification Search
CPC ............... G06F 9/455; G06F 17/30011; G06F 17/2247; G06F 17/30864; G06F 17/30235;

(Continued)

(56) References Cited

U.S. PATENT DOCUMENTS 6,026,198 A * 2/2000 Okada .................... G06T 9/005
341/107
6,760,721 B1 7/2004 Chasen et al.
(Continued)

FOREIGN PATENT DOCUMENTS

JP 2001-034516 A 2/2001
JP 2010-231475 A 10/2010
(Continued)

OTHER PUBLICATIONS

Office Action (Patent Examination Report) dated Nov. 24, 2016, issued by the Australian Patent Office in counterpart Australian Application No. 2013340044.
(Continued)

*Primary Examiner* — Angelica Ruiz
(74) *Attorney, Agent, or Firm* — Sughrue Mion, PLLC

(57) ABSTRACT

There is provided an information processing apparatus. For each of pieces of data each of which belongs to any of data groups constituting a tree structure, a meta-information storage unit stores an identification data string of pieces of identification data of data groups included in a path to a data group to which the piece of data belongs, as a piece of meta-information of the piece of data. A display unit displays an image representing a tree structure composed of virtual data groups corresponding to the data groups, in accordance with pieces of meta-information of the pieces of data. An update unit updates, in a case where at least one of the pieces of identification data has been specified by a user, a piece of meta-information including the specified piece of identification data among the pieces of meta-information.

8 Claims, 8 Drawing Sheets

(58) Field of Classification Search
CPC ......... G06F 17/30997; G06F 17/30067; G06F 17/30115; G06F 17/30722
See application file for complete search history.

(56) References Cited

U.S. PATENT DOCUMENTS

| | | | |
|---|---|---|---|
| 7,031,451 B1* | 4/2006 | Toyoshima | H04M 1/2471 379/352 |
| 2008/0147605 A1 | 6/2008 | Bensalah et al. | |
| 2008/0235610 A1* | 9/2008 | Dettinger | G06F 3/0486 715/769 |
| 2009/0276701 A1* | 11/2009 | Nurmi | G06F 3/0238 715/702 |
| 2010/0250631 A1 | 9/2010 | Kawaharada | |
| 2012/0041929 A1* | 2/2012 | Kapoor | G06F 17/30014 707/661 |

FOREIGN PATENT DOCUMENTS

| | | |
|---|---|---|
| JP | 2010-250400 A | 11/2010 |
| JP | 2011-053881 A | 3/2011 |

OTHER PUBLICATIONS

International Search Report for PCT/JP2013/066023 dated Aug. 6, 2013 [PCT/ISA/210].
Written Opinion for PCT/JP2013/066023 dated Aug. 6, 2013 [PCT/ISA/237].

* cited by examiner

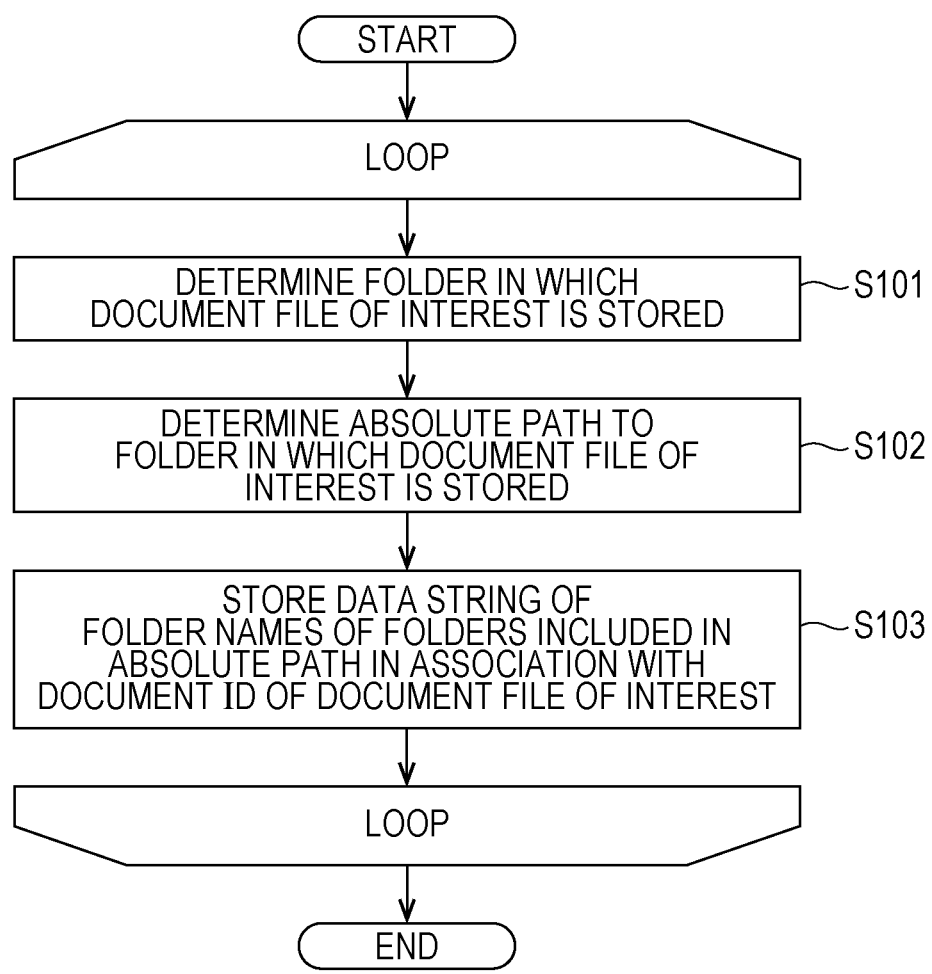

FIG. 5

| DOCUMENT FILE | FIRST LAYER | SECOND LAYER | THIRD LAYER | FOURTH LAYER | ... |
|---|---|---|---|---|---|
| | | METADATA | | | |
| D1 | COMPANY A | ○○ PROJECT | ROUND-ROBIN DOCUMENT | null | |
| D2 | COMPANY A | ○○ PROJECT | CONTRACT | null | |
| D3 | COMPANY A | ×× REGULAR MEETING | MINUTES | 20120101 | |
| D4 | COMPANY A | ×× REGULAR MEETING | MINUTES | 20120102 | |
| D5 | COMPANY A | ×× REGULAR MEETING | DOCUMENT | ASSOCIATED WITH ×× | |
| D6 | COMPANY A | ×× REGULAR MEETING | DOCUMENT | ROUND-ROBIN DOCUMENT | |
| D7 | COMPANY A | ×× REGULAR MEETING | DOCUMENT | ROUND-ROBIN DOCUMENT | |
| D8 | COMPANY A | ×× REGULAR MEETING | DOCUMENT | CONTRACT | |
| D9 | COMPANY A | PROTOTYPE REVIEW | ROUND-ROBIN DOCUMENT | null | |
| D10 | COMPANY A | PROTOTYPE REVIEW | CONTRACT | null | |
| D11 | COMPANY A | PROTOTYPE REVIEW | CONTRACT | null | |
| D12 | ROUND-ROBIN DOCUMENT | COMPANY A | null | null | |
| D13 | ROUND-ROBIN DOCUMENT | COMPANY B | null | null | |

FIG. 7

| DOCUMENT FILE | FIRST LAYER | SECOND LAYER | THIRD LAYER | FOURTH LAYER | ... |
|---|---|---|---|---|---|
| D1 | ROUND-ROBIN DOCUMENT | COMPANY A | ○○ PROJECT | null | |
| D2 | CONTRACT | COMPANY A | ○○ PROJECT | null | |
| D3 | OTHERS | COMPANY A | ×× REGULAR MEETING | MINUTES | |
| D4 | OTHERS | COMPANY A | ×× REGULAR MEETING | MINUTES | |
| D5 | OTHERS | COMPANY A | ×× REGULAR MEETING | DOCUMENT | |
| D6 | ROUND-ROBIN DOCUMENT | COMPANY A | ×× REGULAR MEETING | DOCUMENT | |
| D7 | ROUND-ROBIN DOCUMENT | COMPANY A | ×× REGULAR MEETING | DOCUMENT | |
| D8 | CONTRACT | COMPANY A | ×× REGULAR MEETING | DOCUMENT | |
| D9 | ROUND-ROBIN DOCUMENT | COMPANY A | PROTOTYPE REVIEW | null | |
| D10 | CONTRACT | COMPANY A | PROTOTYPE REVIEW | null | |
| D11 | CONTRACT | COMPANY A | PROTOTYPE REVIEW | null | |
| D12 | ROUND-ROBIN DOCUMENT | COMPANY A | null | null | |
| D13 | ROUND-ROBIN DOCUMENT | COMPANY B | null | null | |

… continued …

INFORMATION PROCESSING APPARATUS, INFORMATION PROCESSING METHOD AND NON-TRANSITORY COMPUTER READABLE MEDIUM

CROSS-REFERENCE TO RELATED APPLICATIONS

This is a continuation of International Application No. PCT/JP2013/066023 filed on Jun. 11, 2013, and claims priority from Japanese Patent Application No. 2012-242129, filed on Nov. 1, 2012.

TECHNICAL FIELD

The present invention relates to an information processing apparatus, an information processing method and a non-transitory computer readable medium.

SUMMARY

According to an aspect of the exemplary embodiments of the present invention, there is provided an information processing apparatus including a unit, a display control unit, and an update unit, the unit causing, for each of plural pieces of data each of which belongs to any of plural data groups constituting a tree structure, a meta-information storage unit to store an identification data string of pieces of identification data of data groups included in a path to a data group to which the piece of data belongs, as a piece of meta-information of the piece of data, the display control unit causing a display unit to display an image representing a tree structure composed of plural virtual data groups corresponding to the plural data groups, in accordance with pieces of meta-information of the plural pieces of data, the update unit updating, in a case where at least one of the pieces of identification data has been specified by a user, a piece of meta-information including the specified piece of identification data among the pieces of meta-information.

BRIEF DESCRIPTION OF DRAWINGS

Exemplary embodiments of the present invention will be described in detail based on the following figures, wherein:

FIG. 4 is a flowchart illustrating a process performed by a controller;

FIG. 5 is a diagram illustrating the content stored in a metadata database;

FIG. 7 is a diagram illustrating the content stored in the metadata database.

DETAILED DESCRIPTION

In the following, an example of an exemplary embodiment of the present invention will be explained in detail with reference to the drawings.

Figure 1:
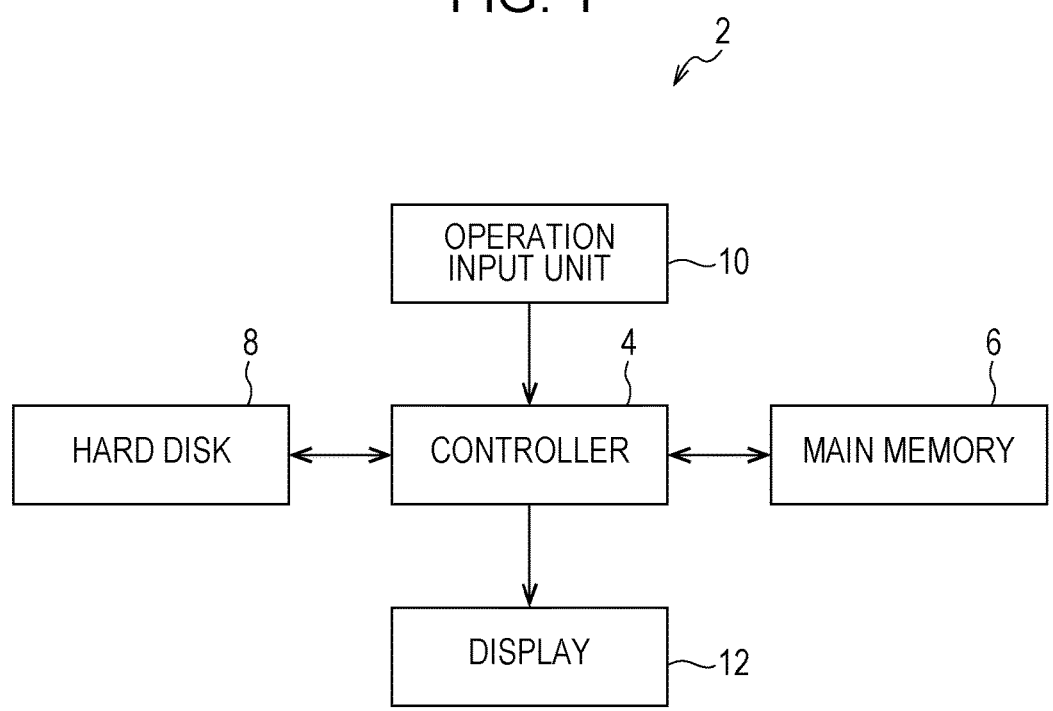
FIG. 1 is a diagram illustrating a configuration of an information processing apparatus.

FIG. 1 is a diagram illustrating a configuration of an information processing apparatus 2 according to the exemplary embodiment of the present invention. In the case of the exemplary embodiment, the information processing apparatus 2 is realized as a personal computer, and includes a controller 4, a main memory 6, a hard disk 8, an operation input unit 10, and a display 12. The controller 4 is a microprocessor and executes various types of information processing in accordance with a program stored in the main memory 6. The main memory 6 is realized by a ROM and a RAM, and the above-described program is stored in the main memory 6. Here, this program is read from a computer-readable information storage medium (for example, a DVD®-ROM) and stored in the main memory 6. This program may also be downloaded via a network and stored in the main memory 6.

The operation input unit 10 is a mouse, a keyboard, and the like, and outputs an operation signal indicating the content of an operation performed by a user to the controller 4. In addition, the display 12 is a display and outputs information in accordance with a command from the controller 4.

A file system is implemented in the information processing apparatus 2, and tree structure data are stored in the hard disk 8, the tree structure data representing a tree structure including plural folders present in the file system. The tree structure data include folder names of folders. In addition, in the tree structure data, the folder name of each folder is associated with the folder name of a parent folder of the folder. A folder corresponds to a "data group". Note that a folder is also called a directory.

Figure 2:
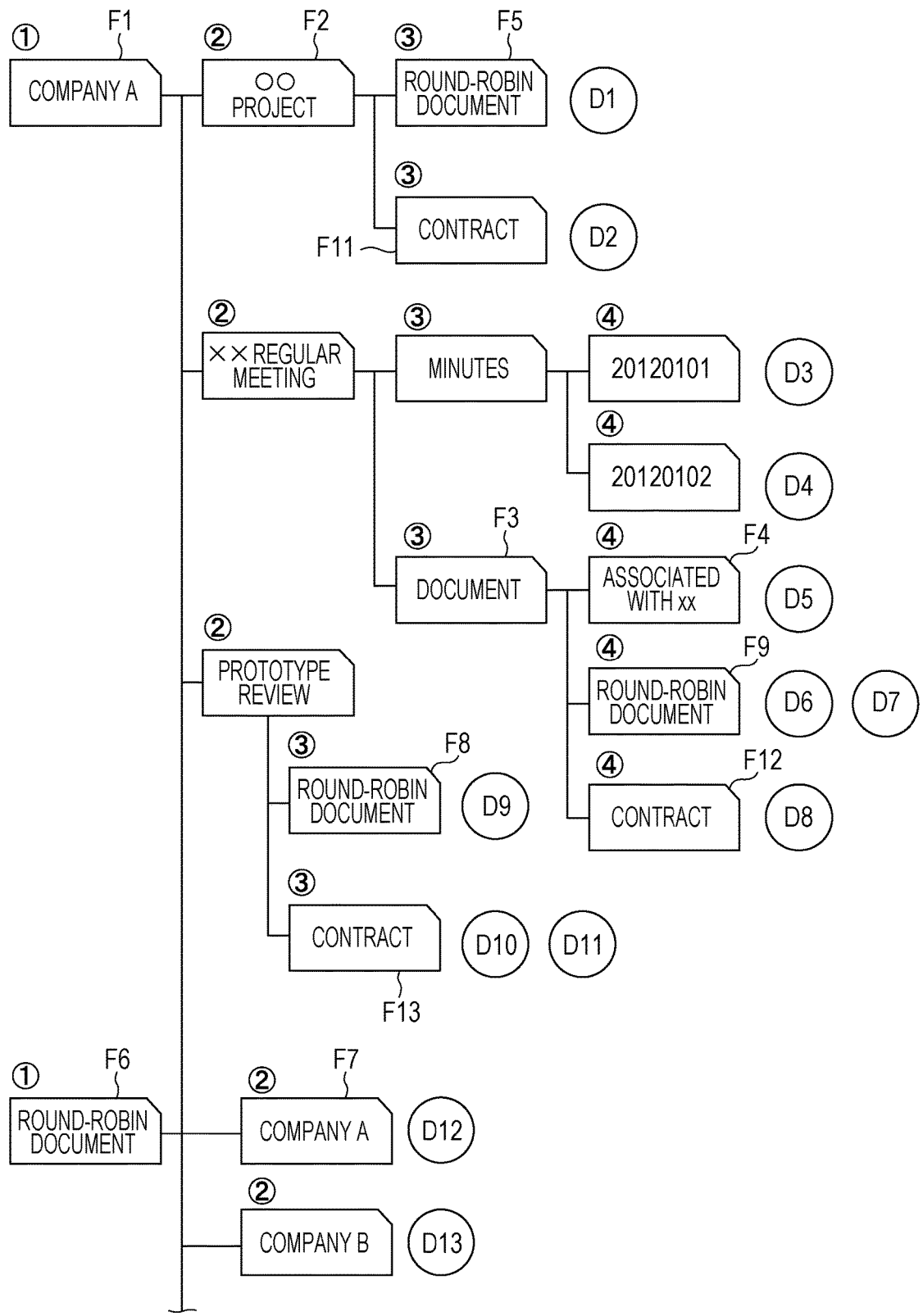
FIG. 2 is a diagram illustrating a tree structure.

FIG. 2 illustrates a tree structure represented by the tree structure data. Substantially rectangular shapes represent folders, each of the substantially rectangular shapes representing a folder. In addition, a character string in a folder indicates a folder name. In addition, a number described at the upper left of each folder indicates a layer where the folder is positioned in the tree structure. For example, a "company A" folder F1 at the upper left in FIG. 2 is positioned in the first layer, a "OO project" folder F2 is positioned in the second layer, a "document" folder F3 is positioned in the third layer, and an "associated with xx" folder F4 is positioned in the fourth layer. Note that a further upper layer of the first layer is a root.

In addition, plural document files present in the file system are stored in the hard disk 8. Document files are document data, and document files correspond to pieces of "data". Circles illustrated in FIG. 2 represent document files, each of the circles representing a document file. Each of the document files is stored in any one of the folders. An ID of the document file (hereinafter referred to as a document ID) is associated with a folder name of the folder where the document file is stored, and is stored in the hard disk S. For example, according to FIG. 2, a document file "D1" is stored in a "round-robin document" folder F5 of the third layer.

Normally, each document file is stored in a folder corresponding to the classification of the document file by a user. For example, according to FIG. 2, since the document file "D1" is a document file for a round-robin document regarding a OO project of a company A, the document file "D1" is stored in the "round-robin document" folder F5 of the third layer. Note that, here, the case is assumed where when the document file "D1" is created, no group of folders is present in and below a "round-robin document" folder F6 of the first layer. Thus, the document file "D1" may originally be stored in a "company A" folder F7 of the second layer, but the document file "D1" is not stored in the "company A" folder F7 of the second layer but in the "round-robin document" folder F5 of the third layer. For information, since a document file "D12", which is a document file for a round-robin document regarding the company A, is created after a group of folders is created in and below the "round-robin document" folder F6 of the first layer, the document file "D12" is stored in the "company A" folder F7 of the second layer.

In the information processing apparatus 2, in the case where an Explorer screen presentation operation has been performed, a predetermined Explorer screen is presented on the display 12. In addition, in the case where an Explorer screen presentation operation has been performed, the controller 4 displays an image representing a tree structure represented by the tree structure data, that is, the image illustrated in FIG. 2 in an Explorer screen in accordance with the tree structure data stored in the hard disk 8. Here, first, after display of only images of folders of the first layer in an Explorer screen, every time a user selects an image of a folder among the folders, the controller 4 displays document files stored in the folder and images of subfolders of the folder in the Explorer screen. The user searches for a desired document file by following the tree structure.

Here, assume the case where the user has selected an image of the "round-robin document" folder F6 of the first layer in an Explorer screen, on the basis of the fact that the document file "D1" is a round-robin document regarding the company A. In this case, even when the tree structure is followed from the "round-robin document" folder F6, the document file "D1" is not found. An operation for following the tree structure from the "company A" folder F1 of the first layer needs to be additionally performed, which is troublesome.

In this respect, in the information processing apparatus 2, the ease of operation for searching for a desired document file is improved in order to ease such a burden.

That is, in the information processing apparatus 2, the user is guided so as to select one of plural viewpoints predetermined on the Explorer screen. In addition, when the user selects one of the viewpoints as necessary, an image of a tree structure (hereinafter referred to as a virtual tree) obtained by arranging images of plural virtual folders corresponding to the respective folders into a tree format in accordance with the selected viewpoint is displayed on the Explorer screen.

Figure 3:
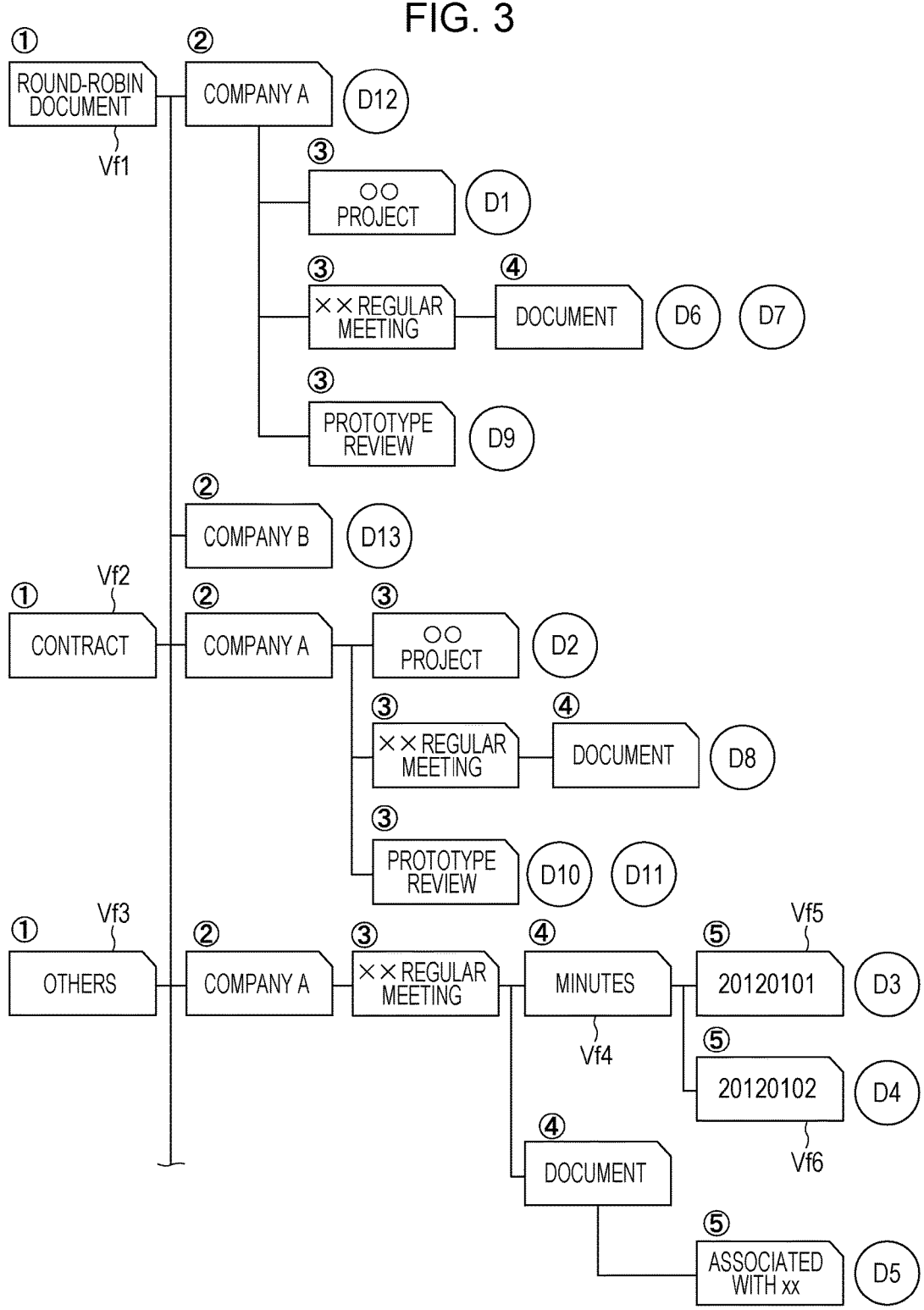
FIG. 3 is a diagram illustrating a virtual tree.

FIG. 3 illustrates a virtual tree displayed on the Explorer screen. Here, a virtual tree obtained in the case where the user, who wants to find the document file "D1", has selected one viewpoint "voucher" is illustrated. Substantially rectangular shapes represent images of virtual folders, each of the substantially rectangular shapes representing an image of a virtual folder. In addition, a character string in a virtual folder indicates a folder name of the virtual folder. In addition, a number described at the upper left of each virtual folder indicates a layer where the virtual folder is positioned in a virtual tree. Note that this number is not displayed on the Explorer screen. As illustrated in FIG. 3, in the case where the viewpoint "voucher" has been selected, a virtual folder Vf1 corresponding to the "round-robin document" folders F5 and F6 and "round-robin document" folders F8 and F9 (see FIG. 2), a virtual folder Vf2 corresponding to "contract" folders F11, F12, and F13 (see FIG. 2), and a virtual folder Vf3 are displayed as virtual folders of the first layer. Note that circles illustrated in FIG. 3 represent document files, each of the circles representing a document file.

In the case of the exemplary embodiment, when one viewpoint is selected, first, only images of virtual folders of the first layer are displayed on the Explorer screen. Thereafter, every time the user selects an image of a virtual folder among the virtual folders, images of virtual subfolders of the virtual folder are displayed on the Explorer screen. The user assuredly finds the document file "D1" by simply following the virtual tree from the virtual folder Vf1.

In the following, a process will be explained, the process being performed by the controller 4 to ease a burden in the case where the user searches for a desired document file. First, a process performed by the controller 4 in the case where an Explorer screen presentation operation has been performed will be explained. In the case where an Explorer screen presentation operation has been performed, the controller 4 performs a process illustrated in FIG. 4 in addition to a process performed for displaying the tree structure illustrated in FIG. 2.

That is, in the process illustrated in FIG. 4, the controller 4 selects each of document files present in the file system as a document file of interest, and executes steps S101 to S103 every time a document file of interest is selected. First, the controller 4 determines a folder in which a document file of interest is stored (S101). That is, in S101, the controller 4 reads a folder name associated with a document ID of the document file of interest from the hard disk 8. Then, the controller 4 determines an absolute path to the folder in which the document file of interest is stored, with reference to the tree structure data (S102). Then, the controller 4 stores a data string of folder names of folders included in the determined absolute path, as a piece of metadata of the document file of interest, in a metadata database stored in the hard disk 8 (hereinafter referred to as a metadata DB) in association with the document ID of the document file of interest (S103).

FIG. 5 illustrates the content stored in the metadata DB. As illustrated in FIG. 5, a piece of metadata of a document file is stored in association with the document ID of the document file in the metadata DB. Here, the position of each folder name in a piece of metadata is determined in accordance with the layer where the folder having the folder name is positioned. That is, a folder name of a folder of the "Nth (N is a positive integer)" layer is positioned at the "Nth" place from the top in a piece of metadata. For example, according to FIG. 2, an absolute path to the folder F5 in which the document file "D1" is stored includes the folders F1, F2, and F5. Since the folder F1 is a folder of the first layer, the folder name of the folder F1 is positioned at the top in a piece of metadata of the document file "D1". In addition, since the folder F2 is a folder of the second layer, the folder name of the folder F2 is positioned at the second place from the top. In addition, since the folder F5 is a folder of the third layer, the folder name of the folder F5 is positioned at the third place from the top.

Next, a process performed by the controller 4 in the case where one viewpoint has been selected by the user will be explained with reference to FIG. 6. In the exemplary embodiment, the user selects one viewpoint and, as a result, terms preset to the viewpoint are specified. For example, the user selects a viewpoint "voucher" and, as a result, two terms "round-robin document" and "contract" preset to the viewpoint "voucher" are specified. That is, in the case where one viewpoint has been selected by the user, first, the controller 4 reads terms preset to the selected viewpoint (hereinafter referred to as designated terms) from the hard disk 8 (S201).

Then, for pieces of metadata stored in the metadata DB, the controller 4 selects each piece of metadata as a piece of metadata of interest and executes steps S202 to S204 every time a piece of metadata of interest is selected.

That is, the controller 4 determines whether or not a folder name including any of the designated terms acquired in S201 is present in the piece of metadata of interest (S202).

Then, in the case where a folder name including any of the designated terms is present in the piece of metadata of interest (Y in S202), the controller 4 updates the piece of metadata of interest in S203 as in the following explanation. That is, the controller 4 moves the folder name including a designated term to the top in the piece of metadata of interest, and other folder names are moved backward by one (S203). In contrast, in the case where a folder name including any of the designated terms is not present in the piece of metadata of interest (N in S202), the controller 4 updates the piece of metadata of interest in S204 as in the following explanation. That is, the controller 4 moves all the folder names backward by one, and an additional folder name "others" is set as a top folder name (S204).

In the case where the viewpoint "voucher" has been specified, the content stored in the metadata DB after execution of steps S202 to S204 on all the pieces of metadata is illustrated in FIG. 7. In FIG. 7, an arrow indicates movement of a folder name.

When steps S202 to S204 are executed on all the pieces of metadata, the controller 4 causes the display 12 to display an image of a virtual tree as illustrated in FIG. 3 in accordance with a certain virtual tree display algorithm, using the pieces of metadata stored in the metadata DB (S205).

That is, in S205, the controller 4 causes the display 12 to display images of virtual folders having names the same as folder names included in pieces of metadata. Here, the display position of an image of a virtual folder is determined by the position of its folder name in a certain piece of metadata. That is, an image of a virtual folder having a name the same as the "Nth (N is a positive integer)" folder name from the top in a certain piece of metadata is displayed in the "Nth" layer of the virtual tree. In addition, an image of a virtual folder having a name the same as the "Nth" folder name from the top in a certain piece of metadata is displayed as a parent folder of a virtual folder having a name the same as the "N+1th" folder name from the top in the certain piece of metadata.

In addition, in S205, the controller 4 causes the display 12 to also display images of document files. Here, an image of a document file is displayed in association with "an image of a virtual folder having a name the same as the last folder name included in a piece of metadata of the document file". Here, the image of the document file is displayed to the immediate right of the image of the virtual folder with which the image of the document file is associated.

As described above, in the exemplary embodiment, the entirety of the virtual tree is not displayed at once, first, only images of virtual folders of the first layer are displayed on the Explorer screen. Thereafter, every time the user selects an image of a virtual folder among the virtual folders, images of virtual subfolders of the virtual folder and images of document files displayed in association with the images of the virtual subfolders are displayed on the Explorer screen. As a result, the virtual tree as illustrated in FIG. 3 is displayed, and the user may assuredly find the document file "D1" by simply following the virtual tree from the virtual folder Vf1.

Moreover, the original tree structure is also maintained. That is, it is unnecessary to update the tree structure data.

Note that an exemplary embodiment of the present invention is not limited to the above-described exemplary embodiment.

For example, the present invention may also be applicable to the case where data other than document data correspond to "data".

Figure 6:
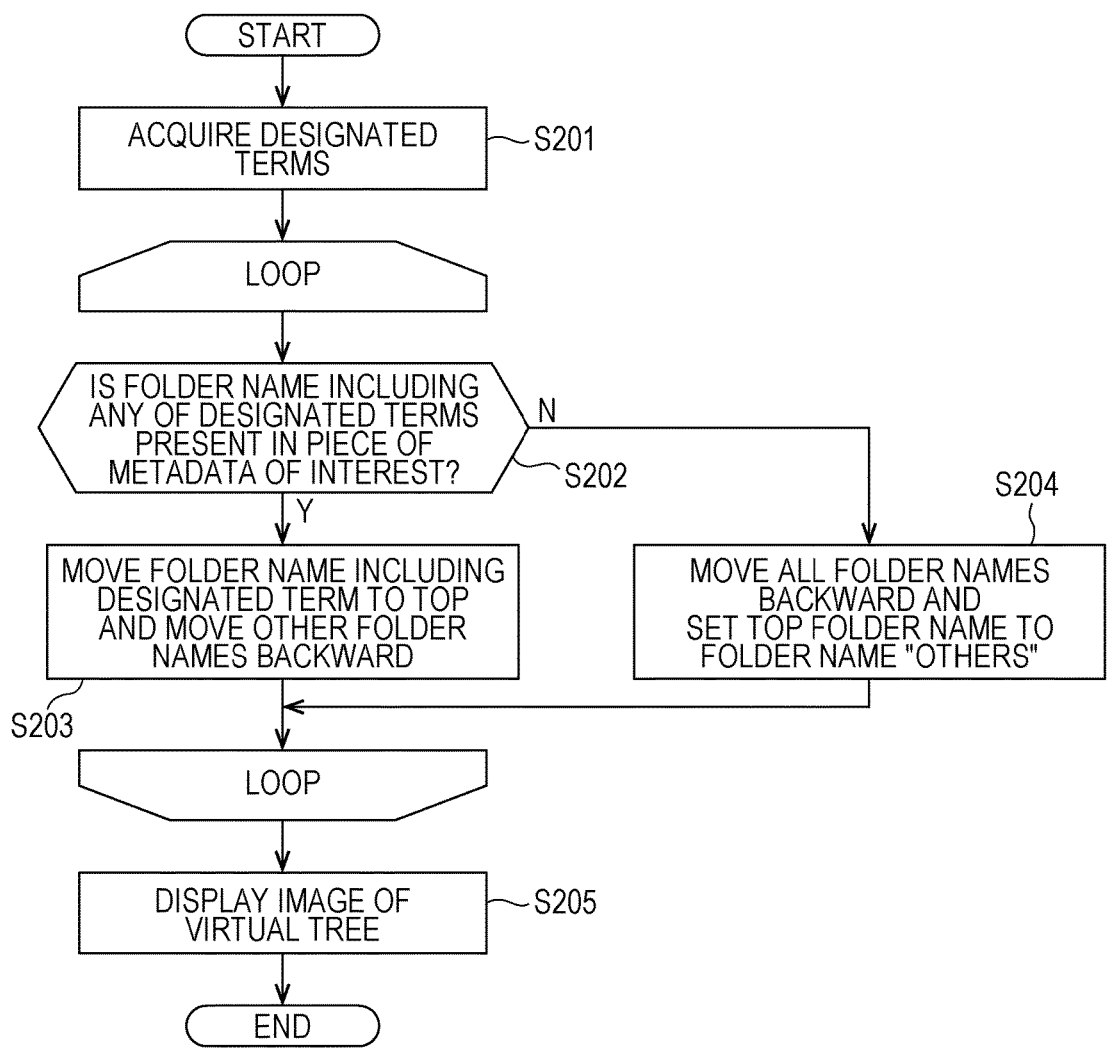
FIG. 6 is a flowchart illustrating a process performed by the controller.
Figure 8:
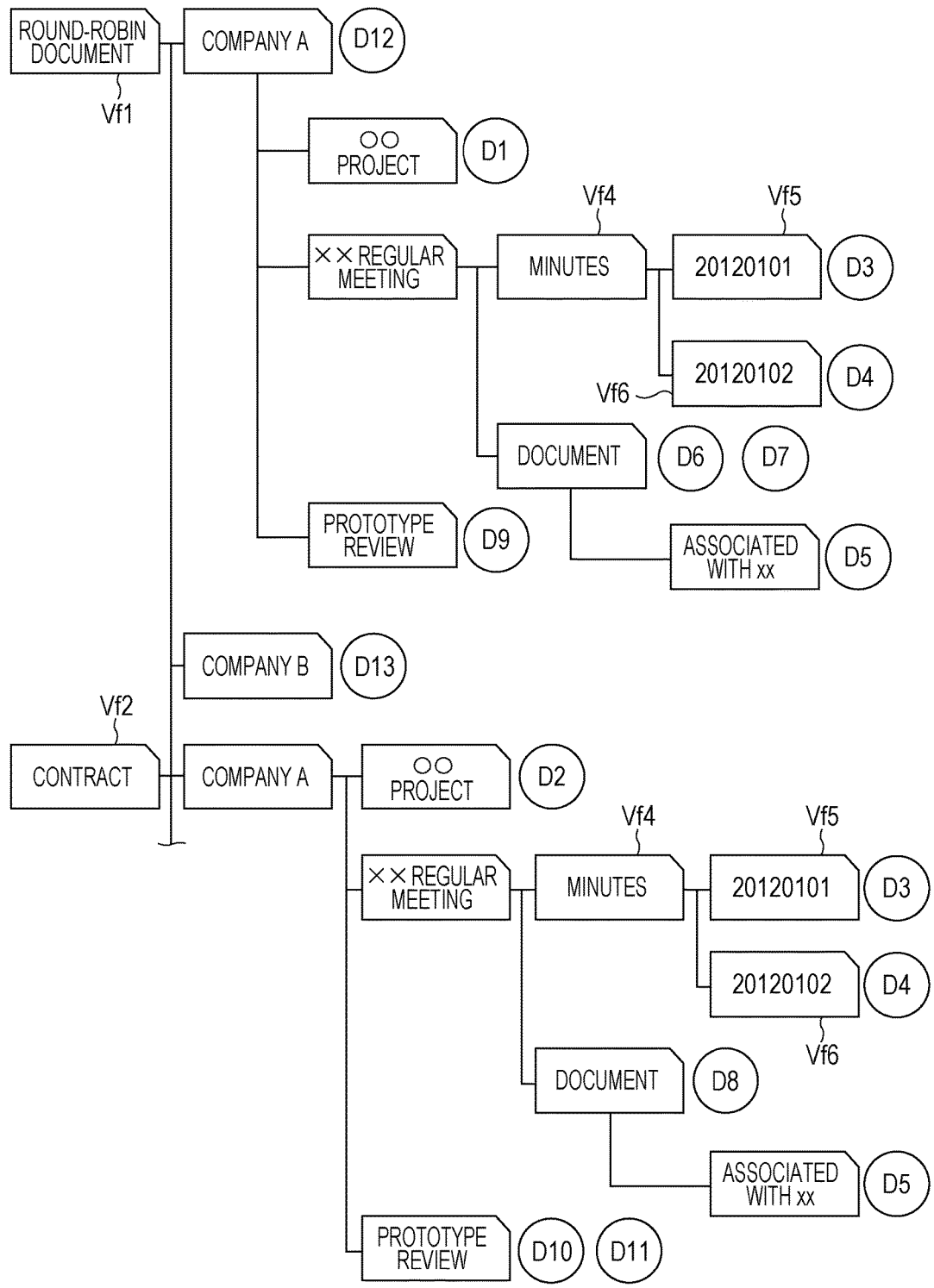
FIG. 8 is a diagram illustrating a virtual tree.

Moreover, step S204 of FIG. 6 may also be omitted by employing another algorithm different from the virtual tree display algorithm described above as a virtual tree display algorithm. FIG. 8 illustrates a virtual tree in the case where another algorithm is employed as a virtual tree display algorithm. In this case, pieces of metadata that do not include the designated terms "round-robin document" and "contract" are not updated in the process illustrated in FIG. 6, and a group of virtual folders in and below the virtual folder Vf3 (see FIG. 3) is omitted from the virtual tree. Note that virtual folders Vf4, Vf5, and Vf6 (see FIG. 3) are displayed below each of the virtual folder Vf1 and the virtual folder Vf2 in the virtual tree.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. An information processing apparatus comprising:
at least one hardware processor configured to implement:
a unit that causes, for each of a plurality of pieces of data each of which belongs to any of a plurality of data groups constituting a first tree structure, a meta-information storage unit to store an identification data string of pieces of identification data of data groups included in a path to a data group to which the piece of data belongs, as a piece of meta-information of the piece of data;
a display control unit that causes a display unit to display an image representing a second tree structure composed of a plurality of virtual data groups corresponding to the plurality of data groups, in accordance with pieces of meta-information of the plurality of pieces of data; and
an update unit that updates, in a case where at least one of the pieces of identification data has been specified by a user, a piece of meta-information including the specified piece of identification data among the pieces of meta-information such that the image displays at least one of the plurality of virtual data groups of the second tree structure in a different order than a corresponding one of the plurality of data groups is arranged in the first tree structure.

2. The information processing apparatus according to claim 1, wherein the update unit updates the piece of meta-information including the specified piece of identification data such that a position of the specified piece of identification data becomes a top of the identification data string.

3. The information processing apparatus according to claim 1, wherein the display control unit causes the display unit to display, in accordance with the pieces of meta-information, the image representing the tree structure composed of the plurality of virtual data groups corresponding to the plurality of data groups, and causes the display unit to display an identification image of the piece of data in association with an identification image of a virtual data group identified by the last piece of identification data among the piece of meta-information of the piece of data.

4. The information processing apparatus according to claim 1, wherein the piece of meta-information comprises a folder name.

5. The information processing apparatus according to claim 4, wherein, in response to determining that a plurality of pieces of meta-information of the first tree structure comprise the folder name, the updating unit updates each of the plurality of pieces of meta-information such that the image displays a representation of each of the plurality of pieces of meta-information as the at least one of the virtual data groups.

6. The information processing apparatus according to claim 1, wherein updating the piece of meta-information does not change an order of the plurality of data groups of the first tree structure.

7. An information processing method comprising:
  causing, for each of a plurality of pieces of data each of which belongs to any of a plurality of data groups constituting a first tree structure, a meta-information storage unit to store an identification data string of pieces of identification data of data groups included in a path to a data group to which the piece of data belongs, as a piece of meta-information of the piece of data;
  causing a display unit to display an image representing a second tree structure composed of a plurality of virtual data groups corresponding to the plurality of data groups, in accordance with pieces of meta-information of the plurality of pieces of data; and
  updating, in a case where at least one of the pieces of identification data has been specified by a user, a piece of meta-information including the specified piece of identification data among the pieces of meta-information such that the image displays at least one of the plurality of virtual data groups of the second tree structure in a different order than a corresponding one of the plurality of data groups is arranged in the first tree structure.

8. A non-transitory computer readable medium storing a program for causing a computer to execute an information processing process, the process comprising:
  causing, for each of a plurality of pieces of data each of which belongs to any of a plurality of data groups constituting a first tree structure, a meta-information storage unit to store an identification data string of pieces of identification data of data groups included in a path to a data group to which the piece of data belongs, as a piece of meta-information of the piece of data;
  causing a display unit to display an image representing a second tree structure composed of a plurality of virtual data groups corresponding to the plurality of data groups, in accordance with pieces of meta-information of the plurality of pieces of data; and
  updating, in a case where at least one of the pieces of identification data has been specified by a user, a piece of meta-information including the specified piece of identification data among the pieces of meta-information such that the image displays at least one of the plurality of virtual data groups of the second tree structure in a different order than a corresponding one of the plurality of data groups is arranged in the first tree structure.

* * * * *